United States Patent
Chen et al.

(10) Patent No.: US 9,335,524 B2
(45) Date of Patent: May 10, 2016

(54) PROJECTION LENS

(71) Applicant: Young Optics Inc., Hsinchu (TW)

(72) Inventors: Yi-Hsueh Chen, Hsin-Chu (TW);
Hsin-Hung Lin, Hsin-Chu (TW);
Chun-Tung Wu, Hsin-Chu (TW);
Kun-Yao Chen, Hsin-Chu (TW)

(73) Assignee: YOUNG OPTICS INC., Hsinchu (TW)

( * ) Notice: Subject to any disclaimer, the term of this patent is extended or adjusted under 35 U.S.C. 154(b) by 0 days.

(21) Appl. No.: 14/311,516

(22) Filed: Jun. 23, 2014

(65) Prior Publication Data

US 2015/0116840 A1 Apr. 30, 2015

(30) Foreign Application Priority Data

Oct. 31, 2013 (TW) .............................. 102139590 A
Apr. 2, 2014 (TW) .............................. 103112337 A

(51) Int. Cl.
*G02B 9/00* (2006.01)
*G02B 13/16* (2006.01)
*G02B 13/18* (2006.01)

(52) U.S. Cl.
CPC ................ *G02B 13/16* (2013.01); *G02B 13/18* (2013.01)

(58) Field of Classification Search
CPC ....................................................... G02B 13/16
USPC .................................................. 359/649–651
See application file for complete search history.

(56) References Cited

U.S. PATENT DOCUMENTS

| 6,888,682 | B2 | 5/2005 | Kawakami | |
|---|---|---|---|---|
| 8,279,527 | B2 | 10/2012 | Lin | |
| 2010/0232039 | A1* | 9/2010 | Chen | G02B 13/16 359/728 |
| 2011/0292515 | A1* | 12/2011 | Kang | G02B 5/10 359/649 |

FOREIGN PATENT DOCUMENTS

| CH | 103293642 | 9/2013 |
|---|---|---|
| TW | 201144855 | 12/2011 |
| TW | 103293642 | 9/2013 |

* cited by examiner

*Primary Examiner* — William Choi
(74) *Attorney, Agent, or Firm* — WPAT, P.C.; Justin King

(57) ABSTRACT

A projection lens for a projection device having a light valve is provided. The light valve provides an image light beam. The projection lens includes a first lens group, a second lens group and a reflecting lens group. The second lens group is disposed between the first lens group and the reflecting lens group. The first lens group has positive refractive power. The second lens group has positive refractive power and includes a plurality of lenses and an aperture stop located between the lenses. An angle of a field of view of the second lens group is less than 100 degrees. The reflecting lens has negative reflective power and has a curved reflecting surface to reflect the image light beam passed through the second lens group.

19 Claims, 2 Drawing Sheets

PROJECTION LENS

FIELD OF THE INVENTION

The invention relates to a lens, and more particularly to a projection lens.

BACKGROUND OF THE INVENTION

The projection lens applied to a projector requires high imaging quality, in generally, the frame projected by the projection lens must conform to several conditions, such as a requirement of low distortion aberration, a requirement of high resolution, a requirement of high contrast, and a requirement of high uniformity, etc. In present, the wide-angle projection lens is developed to shorten the projection distance between the projector and a screen. However, the relatively problem is the designer of the projection lens must reduce the aberration derived from the wide-angle projection lens.

So far the major methods of aberration improvement include using multiple aspheric lenses, increasing the length of the projection lens, and using more number of lenses to correct the aberration, etc. Moreover, the above improvements of projection lens have produced several patents upon the projection quality, for example, U.S. Pat. No. 8,337,024, U.S. Pat. No. 8,363,318, U.S. Pat. No. 7,488,077, and U.S. Pat. No. 7,009,765, these patents are related to the projection quality improvement of the projection lens. However, the projection lens of the above patents even though improves the projection quality, the above patents can not reduce overall volume of the projection lens, and performing the above patents has a high cost shortcoming in the mass production.

Thus, how to design a projection lens having high imaging quality, small size and low cost of manufacture has become an important issue.

SUMMARY OF THE INVENTION

The invention provides a projection lens to effectively reduce the overall volume of the projection lens, improve imaging quality of the projection lens and reduce cost of manufacture.

An embodiment of the invention provides a projection lens used for a projection device having a light valve, wherein the light valve is adapted to provide an image light beam. The projection lens includes a first lens group, a second lens group and a reflecting lens group. The first lens group has positive refractive power. The second lens group has positive refractive power, and the second lens group is disposed at a side of the first lens group far away from the light valve. The second lens group includes a plurality of lenses and an aperture stop located between the lenses of the second lens group, wherein an angle of a field of view of the second lens group is less than 100 degrees. The reflecting lens group has negative reflecting power and is located at a side of the second lens group far away from the first lens group. The reflecting lens group has a curved reflecting surface to reflect the image light beam passed through the second lens group.

In an embodiment of the invention, a throw ratio of the projection lens is in a range between 0.1 and 0.4.

In an embodiment of the invention, the angle of the field of view is greater than 20 degrees.

In an embodiment of the invention, the first lens group includes a first lens, a second lens, a third lens, a fourth lens, a fifth lens, a sixth lens, a seventh lens and a eighth lens, which are arranged in order in a direction from the light valve to the second lens group. Moreover, the lenses of the second lens group includes a ninth lens, a tenth lens and a eleventh lens, which are arranged in order in a direction from the first lens group to the reflecting lens group.

In an embodiment of the invention, the first lens and the fifth lens respectively have negative refractive power. The second lens, the third lens, the fourth lens, the sixth lens, the seventh, the eighth lens, the ninth lens, the tenth lens and the eleventh lens respectively have positive refractive power.

In an embodiment of the invention, the first lens group also has an aperture stop located in the second lens or the third lens.

In an embodiment of the invention, the first lens, the seventh lens, the eighth lens, the ninth lens and the tenth lens are aspheric lenses.

In an embodiment of the invention, a compound lens is formed with the fourth lens and the fifth lens.

In an embodiment of the invention, the first lens group further includes a twelfth lens disposed between the seventh lens and the eighth lens.

In an embodiment of the invention, the twelfth lens has positive refractive power. Moreover, the first lens, the eighth lens, the ninth lens, the tenth lens and the twelfth lens are aspheric lenses.

In an embodiment of the invention, a diameter of the eleventh lens is in a range between 10 mm and 30 mm.

In an embodiment of the invention, the aperture stop of the second lens group is located between the tenth lens and the eleventh lens.

In the embodiment of the invention, the projection lens can keep good imaging quality by means of positioning the first lens group, the second lens group and the reflecting lens group, by means of a function of wide-angle lens group provided by the reflecting lens group, by means of a compensation for an image distortion generated by the wide-angle projection of the reflecting lens group. Under the premise of good image quality, the overall volume of the projection lens can be reduced and the manufacture cost of the projection lens also can be lowered.

DETAILED DESCRIPTION OF THE INVENTION

Figure 1:
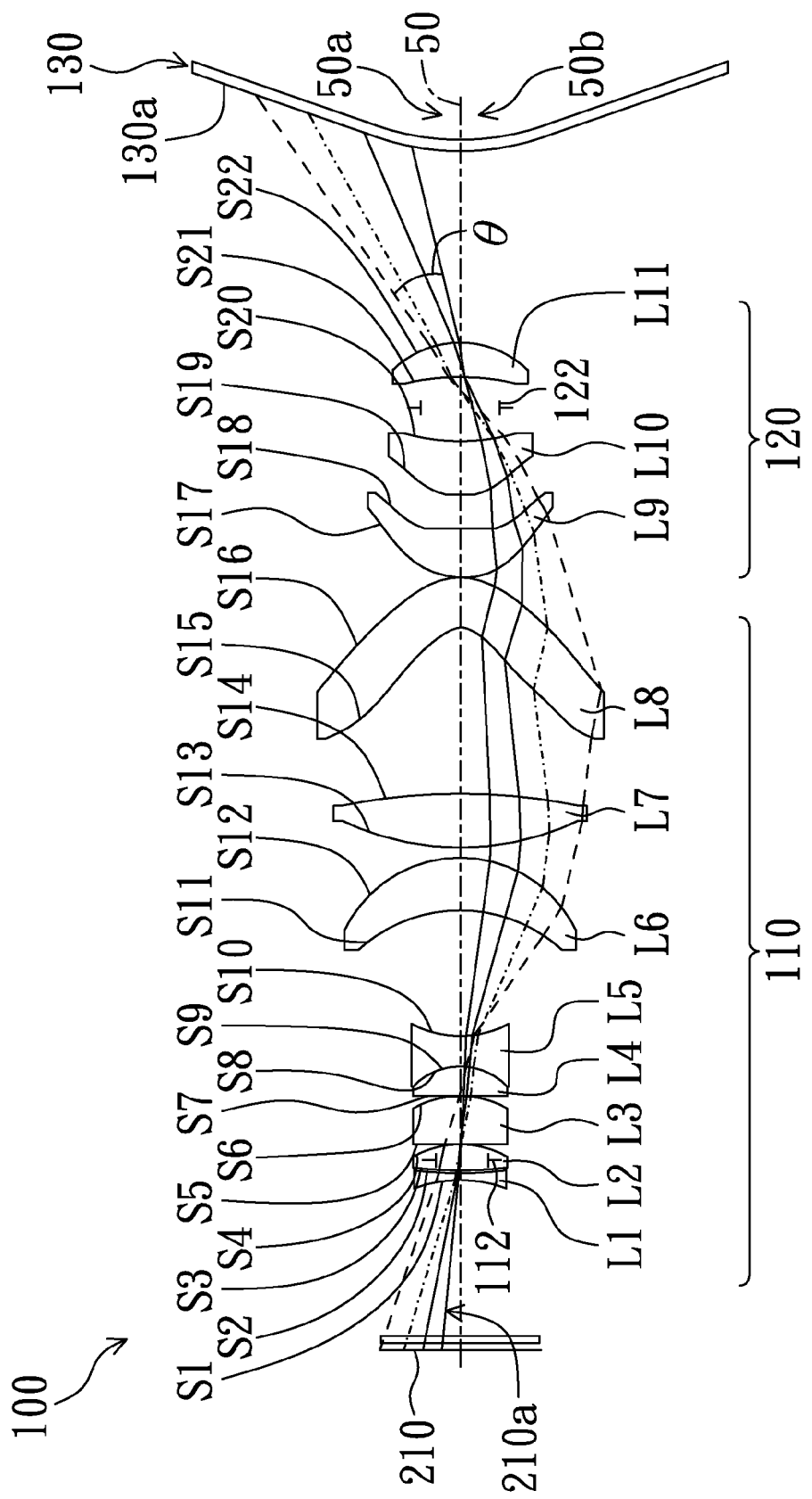
FIG. 1 is a schematic view showing a projection lens according to an embodiment of the invention.

FIG. 1 is a schematic view showing a projection lens according to an embodiment of the invention. Referring to FIG. 1, a projection lens 100 in accordance with the embodiment of has an optical axis 50, and is used for a projection device having a light valve 210, the light valve 210 is adapted to provide an image light beam 210a to the projection lens 100, but the invention is not limited to that. The optical axis 50 has a first side 50a and a second side 50b opposite to the first side 50a, wherein the light valve 210 is adapted to provide the image light beam 210a from the first side 50a of the optical axis 50. The light valve 210 is used for converting an illumination light beam (not shown) provided by a light source of the projection device to the image light beam 210a, and the light valve 210 may be a reflective light valve, for example, but not limited to DMD (digital micro-mirror device), or LCOS panel (liquid crystal on silicon panel). Moreover, the light valve 210 may be a transmission light valve, such as transmission LCD panel (liquid crystal display panel). The center of the light valve 210 is aligned with the optical axis 50, and solely a part of the light valve 210 located at the first side 50a is used to provide the image light beam 210a. In another embodiment, the center of the light valve 210 is offset toward the first side 50a, and thereby a light valve having smaller size can be used.

The projection lens 100 of the embodiment includes a first lens group 110, a second lens group 120 and a reflecting lens group 130. The first lens group 110 has positive refractive power, the second lens group 120 has positive refractive power, and the reflecting lens group 130 has negative reflecting power. In the embodiment, the first lens group 110 includes a first lens L1 having negative refractive power, a second lens L2 having positive refractive power, a third lens L3 having positive refractive power, a fourth lens L4 having positive refractive power, a fifth lens L5 having negative refractive power, a sixth lens L6 having positive refractive power, a seventh lens L7 having positive refractive power and a eighth lens L8 having positive refractive power, which are arranged in order in a direction from the light valve 210 to the second lens group 120. In the embodiment, the first lens group 110 also has an aperture stop 112 located in the second lens L2, but the invention is not limited to that. In the embodiment, a compound lens is formed with the fourth lens L4 and the fifth lens L5, the compound lens can have negative refractive power, the compound lens can be a cemented lens, but the invention is not limited to that.

Moreover, the second lens group 120 has positive refractive power, and the second lens group 120 is disposed at a side of the first lens group 110 far away from the light valve 210, wherein the second lens group 120 includes a plurality of lenses. In the embodiment, the second lens group 120 includes a ninth lens L9 having positive refractive power, a tenth lens L10 having positive refractive power and a eleventh lens L11 having positive refractive power, which are arranged in order in a direction from the first lens group 110 to the reflecting lens group 130. In the embodiment, the second lens group 120 has an aperture stop 122, which is located between the lenses of the second lens group 120. Specifically, in the embodiment, the aperture stop 122 of second lens group 120 is located between the tenth lens L10 and the eleventh lens L11, but the invention is not limited to that.

The reflecting lens group 130 has negative reflecting power and is located at a side of the second lens group 120 far away from the first lens group 110. In the embodiment, the reflecting lens group 130 can be a reflecting lens, but in another embodiment, the reflecting lens group 130 can include a plurality of reflecting lenses, the invention is not limited to the number of reflecting lens. The reflecting lens group 130 has a curved reflecting surface 130a to reflect the image light beam 210a which passed through the second lens group 120 and then transmitted to the first side 50a of optical axis 50. Further, the curved reflecting surface 130a of reflecting lens group 130 is configured to reflect the image light beam 210a passed through the second lens group 120 to a screen (not shown), thereby projecting an image frame on the screen (not shown). In the embodiment, after the image light beam 210a passes through the first lens group 110, the image light beam 210a sequentially transmits to the ninth lens L9 and the tenth lens L10, afterward the image light beam 210a is converged on the aperture stop 122, afterward the image light beam 210a passed through the aperture stop 122 divergently passes through the eleventh lens L11, afterward the divergent image light beam 210a transmits to the reflecting lens group 130. More specifically, an image upon the light valve 210 (not shown) is projected on the screen (not shown) by the first lens group 110, the second lens group 120 and the reflecting lens group 130 to generate the image frame which is enlarged. Moreover, an image distortion generated by the wide-angle projection of the reflecting lens group 130 is compensated when the image light beam 210a is reflected and projected by the reflecting lens group 130, and thus the quality of the image frame can be improved. In the embodiment, both of the image frame and the light valve 210 located at the first side 50a of optical axis 50, thereby efficiently using the inner space of projection lens 100, so as to avoid wasting the inner space of projection lens 100, and the overall volume of the projection device can be reduced.

The following contents described the relevant data for projection lens 100 of the embodiment, such as Table 1 listed the relevant data below, but the invention is not limited to that. One skilled in the art could properly modify the parameters and the design of the embodiment after reading the specification of the invention, however it is within the scope and spirit of the invention disclosed herein.

TABLE 1

Projection lens relevant data of the embodiment of FIG. 1

| | Surface | Curvature (1/mm) | Interval (mm) | Glass index | Abbe Value | Radius (mm) |
|---|---|---|---|---|---|---|
| First lens L1 | S1 | −0.0699 | | | | 7.19 |
| | | | 1.00 | 1.54 | 64.50 | |
| | S2 | −0.0287 | | | | 7.32 |
| Second lens L2 | S3 | 0.0188 | | | | 7.46 |
| | | | 4.19 | 1.83 | 39.10 | |
| | S4 | −0.0665 | | | | 7.56 |
| Third lens L3 | S5 | −0.0040 | | | | 6.69 |
| | | | 7.68 | 1.50 | 81.60 | |
| | S6 | −0.0707 | | | | 7.60 |
| Fourth lens L4/ | S7 | −0.0131 | 4.55 | 1.80 | 46.60 | 7.47 |
| Fifth lens L5 | S8/S9 | −0.1004 | | | | 7.49 |
| | | | 4.86 | 1.85 | 23.80 | |
| | S10 | 0.0559 | | | | 7.85 |
| Sixth lens L6 | S11 | −0.0397 | | | | 16.3 |
| | | | 8.50 | 1.92 | 20.90 | |
| | S12 | −0.0488 | | | | 18.5 |
| Seventh lens L7 | S13 | 0.0263 | | | | 20.0 |
| | | | 8.50 | 1.53 | 56.00 | |
| | S14 | −0.0121 | | | | 20.1 |
| Eighth lens L8 | S15 | −0.3606 | | | | 21.5 |
| | | | 7.90 | 1.53 | 56.00 | |
| | S16 | −0.1113 | | | | 22.7 |
| Ninth lens L9 | S17 | 0.0614 | | | | 14.7 |
| | | | 7.71 | 1.49 | 70.20 | |
| | S18 | −0.0478 | | | | 13.9 |
| Tenth lens L10 | S19 | 0.0658 | | | | 11.5 |
| | | | 8.50 | 1.53 | 56.00 | |
| | S20 | 0.0352 | | | | 9.91 |
| Eleventh lens L11 | S21 | −0.0228 | | | | 9.13 |
| | | | 5.59 | 1.44 | 95.10 | |
| | S22 | −0.0655 | | | | 10.8 |
| Reflecting lens group 130 | 130a | 0.0359 | 0.00 | nil | nil | 42.8 |

In the Table 1, the surfaces S1 to S22 and the reflecting surface 130a are arranged in order in a direction from the light valve 210 to the reflecting lens group 130, wherein the first lens L1 has two surfaces S1, S2, the second lens L2 has two surfaces S3, S4, the third lens L3 has two surfaces S5, S6, the fourth lens L4 has two surfaces S7, S8, the fifth lens L5 has two surfaces S9, S10, the sixth lens L6 has two surfaces S11, S12, the seventh lens L7 has two surfaces S13, S14, the eighth lens L8 has two surfaces S15, S16, the ninth lens L9 has two surfaces S17, S18, the tenth lens L10 has two surfaces S19, S20, and the eleventh lens L11 has two surfaces S21, S22. The aforesaid two surfaces of each lens have an interval therebetween, and specify the interval is a straight-line distance between the two surfaces of each lens, and the straight-line distance is located on the optical axis 50.

Further, in the embodiment, the straight-line distance from the surface S2 of first lens L1 to the surface S3 of second lens L2 is 0.41 mm upon the optical axis 50. The straight-line distance from the surface S4 of second lens L2 to the surface S5 of third lens L3 is 0.1 mm upon the optical axis 50. The straight-line distance from the surface S6 of third lens L3 to the surface S7 of fourth lens L4 is 0.1 mm upon the optical axis 50. The straight-line distance from the surface S10 of fifth lens L5 to the surface S11 of sixth lens L6 is 19.7 mm upon the optical axis 50. The straight-line distance from the surface S12 of sixth lens L6 to the surface S13 of seventh lens L7 is 1.68 mm upon the optical axis 50. The straight-line distance from the surface S14 of seventh lens L7 to the surface S15 of eighth lens L8 is 26.52 mm upon the optical axis 50. The straight-line distance from the surface S16 of eighth lens L8 to the surface S17 of ninth lens L9 is 0.1 mm upon the optical axis 50. The straight-line distance from the surface S18 of ninth lens L9 to the surface S19 of tenth lens L10 is 5.28 mm upon the optical axis 50. The straight-line distance from the surface S20 of tenth lens L10 to the surface S21 of eleventh lens L11 is 10.21 mm upon the optical axis 50. The straight-line distance from the surface S22 of eleventh lens L11 to the reflecting surface 130a of reflecting lens group 130 is 30.28 mm upon the optical axis 50. The above data are only exemplified to describe the embodiment, but the invention is not limited to that.

In the embodiment, the first lens L1, the seventh L7, the eighth lens L8, the ninth lens L9 and the tenth lens L10 are aspheric lenses, and the reflecting surface 130a is an aspheric surface, wherein the surfaces S1, S2, S13, S14, S15, S16, S17, S18, S19 and S20 are aspheric surfaces. Thus, the shapes of the surfaces S1, S2, S13, S14, S15, S16, S17, S18, S19, S20 and the reflecting surface 130a conform to the aspheric surface formula as given in Equation (E1):

$$Z(h) = \frac{h^2/r}{1+\sqrt{1-(1+k)(h^2/r^2)}} + C_2h^2 + C_4h^4 + \\ C_6h^6 + C_8h^8 + C_{10}h^{10} + C_{12}h^{12} + C_{14}h^{14} + C_{16}h^{16} \ldots \quad (E1)$$

Wherein "Z(h)" represents a sag in a direction of the optical axis 50. "r" represents a radius of an osculating sphere, that is, the curvature radius of the position near the optical axis 50 (as shown in Table 1, the reciprocal of the curvature of the surfaces S1, S2, S13, S14, S15, S16, S17, S18, S19, S20 and the reflecting surface 130a). "k" represents a conic constant. "h" represents a height of the aspheric surface, that is, a height from a center of the aspheric lens to an edge of the aspheric lens. "$C_2$", "$C_4$", "$C_6$", "$C_8$", "$C_{10}$", "$C_{12}$", "$C_{14}$" and "$C_{16}$", etc. respectively represent aspheric coefficients. Values of k, $C_2$, $C_4$, $C_6$, $C_8$, $C_{10}$, $C_{12}$, $C_{14}$ and $C_{16}$ are shown in Table 2.

In the embodiment, since the reflecting lens group 130 provides a function of wide-angle lens group, an angle θ of a field of view of the second lens group 120 may be less than 100 degrees and greater than 20 degrees, and therefore, the lens diameter of the first lens group 110 and the second lens group 120 can be effectively reduced. The image light beam 210a passes through the second lens group 120 and then transmits to the part of the curved reflecting surface 130a located at the first side 50a of optical axis 50, so as to correspondingly decrease the component configuration located at the second side 50b of optical axis 50. Thus, the overall volume of the projection lens 100 can be reduced, and the manufacture cost can be reduced. Moreover, in the projection lens 100 of the embodiment, the second lens group 120 is provided with the aperture stop 122, such that, the diameter of the second lens group 120 is further reduced, the offset of the light valve 210 relative to the optical axis 50 is reduced, and/or the distance between the reflecting lens group 130 and the second lens group 120 is shortened. Further, in the embodiment, as a result of the diameter of the lens in the second lens group 120 (e.g., the eleventh lens L11) closest to the reflecting lens group 130 can be reduced, the image light beam 210a reflected by the reflecting lens group 130 is difficult to interfere with the eleventh lens L11, so as to prevent the quality of image frame from being affected. Specifically, the diameter of the eleventh lens L11 of the embodiment can be effectively reduced to about 20 mm, but the invention is not limited to that. In the projection lens 100 used the configuration of the invention, the diameter of the lens in the second lens group 120 (e.g., the eleventh lens L11) closest to the reflecting lens group 130 can be reduced in a range between 10 mm and 30 mm. Moreover, the throw ratio of the projection lens 100 is about 0.25 in the embodiment, but the invention is not limited to that. The throw ratio of the projection lens 100 used the configuration of the invention can be maintained in a range between 0.1 and 0.4.

Figure 2:
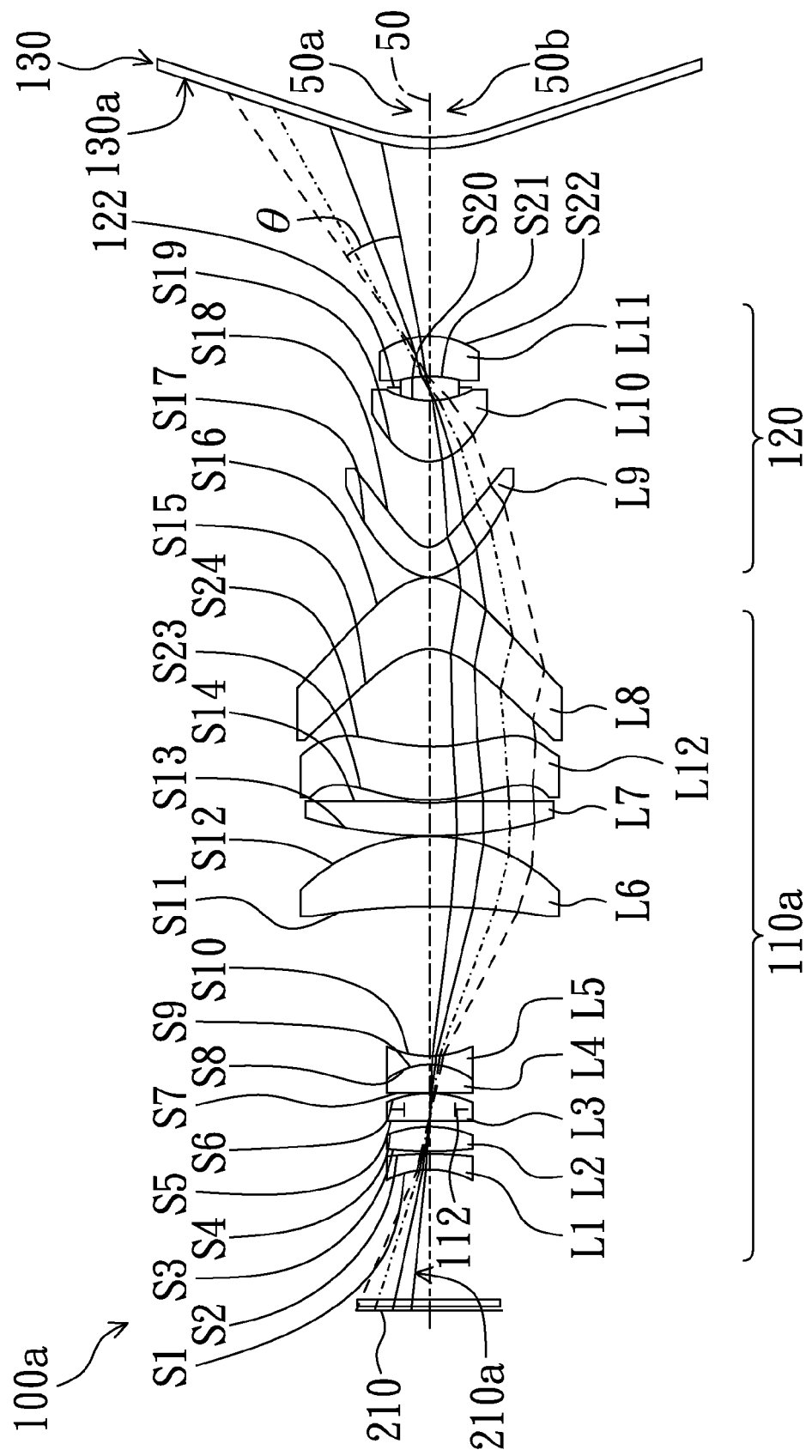
FIG. 2 is a schematic view showing a projection lens according to another embodiment of the invention.

FIG. 2 is a schematic view showing a projection lens according to another embodiment of the invention. Referring to FIG. 2, since the structure or function of the projection lens 100a of the embodiment is similar to the projection lens 100 of FIG. 1, the embodiment will not repeat the same description.

The first lens group 110a of projection lens 100a further includes a twelfth lens L12 having positive refractive power and disposed between the seventh lens L7 and the eighth lens L8. Moreover, the aperture stop 112 of first lens group 110a can be located in the second lens L2 (as shown in FIG. 1) or the third lens L3 (as shown in FIG. 2).

TABLE 2

Aspheric coefficients of the embodiment of FIG. 1

| surface | k | $C_2$ | $C_4$ | $C_6$ | $C_8$ | $C_{10}$ | $C_{12}$ | $C_{14}$ | $C_{16}$ |
|---------|---|-------|-------|-------|-------|----------|----------|----------|----------|
| S1   | −5.31E−01 | 0 | 4.72E−04  | −8.98E−06 | 5.17E−08  | −1.15E−11 | 0.00E+00  | 0.00E+00  | 0.00E+00 |
| S2   | −8.54E+00 | 0 | 6.45E−04  | −6.49E−06 | 5.30E−10  | 1.08E−09  | −1.35E−11 | 6.05E−14  | 0.00E+00 |
| S13  | −1.95E+00 | 0 | −3.49E−06 | 9.64E−08  | −5.99E−10 | 1.81E−12  | −3.24E−15 | 2.29E−18  | 0.00E+00 |
| S14  | 6.79E+00  | 0 | −5.51E−06 | 2.16E−07  | −1.55E−09 | 5.67E−12  | −1.10E−14 | 8.96E−18  | 0.00E+00 |
| S15  | −1.59E+00 | 0 | 1.94E−04  | −1.74E−06 | 9.56E−09  | −3.34E−11 | 7.09E−14  | −8.15E−17 | 3.88E−20 |
| S16  | −1.07E+00 | 0 | 1.54E−04  | −9.07E−07 | 3.26E−09  | −6.95E−12 | 7.99E−15  | −3.74E−18 | 0.00E+00 |
| S17  | 0.00E+00  | 0 | 2.56E−04  | −2.13E−06 | 2.50E−08  | −2.32E−10 | 1.01E−12  | −1.66E−15 | 0.00E+00 |
| S18  | 0.00E+00  | 0 | 8.65E−04  | −1.95E−07 | −7.85E−08 | 6.73E−10  | −2.34E−12 | 3.01E−15  | 0.00E+00 |
| S19  | −8.33E−01 | 0 | 6.69E−04  | −1.10E−05 | 1.32E−07  | −1.16E−09 | 5.44E−12  | −9.92E−15 | 0.00E+00 |
| S20  | −6.22E+00 | 0 | 5.48E−05  | −6.58E−07 | −1.29E−08 | 2.75E−10  | −2.11E−12 | 7.23E−15  | 0.00E+00 |
| 130a | −8.33E+00 | 0 | 1.57E−06  | −3.48E−09 | 3.83E−12  | −2.55E−15 | 1.03E−18  | −2.30E−22 | 2.19E−26 |

The following contents described the relevant data for projection lens 100a of the second embodiment, such as Table 3 listed the relevant data below, but the invention is not limited to that. One skilled in the art could properly modify the parameters and the design of the embodiment after reading the specification of the invention, however it is within the scope and spirit of the invention disclosed herein.

TABLE 3

Projection lens relevant datum of the embodiment of FIG. 2

| | Surface | Curvature (1/mm) | Interval (mm) | Glass index | Abbe Value | Radius (mm) |
|---|---|---|---|---|---|---|
| First lens L1 | S1 | −0.0731 | | | | 6.81 |
| | | | 2.52 | 1.62 | 59.5 | |
| | S2 | −0.0323 | | | | 7.07 |
| Second lens L2 | S3 | 0.0181 | 4.10 | 1.80 | 30.9 | 7.28 |
| | S4 | −0.0561 | | | | 7.34 |
| | S5 | 0.0015 | | | | 6.43 |
| Third lens L3 | | | 4.66 | 1.56 | 59.6 | |
| | S6 | −0.0562 | | | | 7.01 |
| | S7 | 0.0043 | 4.65 | 1.77 | 53.1 | 7.10 |
| Fourth lens L4/ Fifth lens L5 | S8/S9 | −0.0879 | | | | 7.13 |
| | | | 1.43 | 1.81 | 21.9 | |
| | S10 | 0.0572 | | | | 7.29 |
| Sixth lens L6 | S11 | −0.0080 | | | | 19.9 |
| | | | 11.62 | 1.77 | 32.4 | |
| | S12 | −0.0338 | | | | 21.4 |
| Seventh lens L7 | S13 | 0.0138 | | | | 20.5 |
| | | | 5.57 | 1.63 | 52.7 | |
| | S14 | 0.0006 | | | | 20.0 |
| Twelfth lens L12 | S23 | 0.0363 | | | | 19.9 |
| | | | 8.71 | 1.52 | 56.0 | |
| | S24 | 0.0362 | | | | 21.3 |
| Eighth lens L8 | S15 | −0.1727 | | | | 20.8 |
| | | | 12.00 | 1.52 | 56.0 | |
| | S16 | −0.1934 | | | | 21.8 |
| Ninth lens L9 | S17 | 0.1794 | | | | 14.0 |
| | | | 4.92 | 1.52 | 56.0 | |
| | S18 | 0.4852 | | | | 12.5 |
| Tenth lens L10 | S19 | 0.1639 | | | | 9.45 |
| | | | 10.24 | 1.52 | 56.0 | |
| | S20 | 0.0490 | | | | 7.03 |
| Eleventh lens L11 | S21 | −0.0482 | | | | 5.97 |
| | | | 6.52 | 1.44 | 90.3 | |
| | S22 | −0.0713 | | | | 8.14 |
| Reflecting lens group 130 | 130a | 0.0444 | 0.00 | nil | nil | 45.0 |

In the Table 3, the surfaces S1 to S24 and the reflecting surface 130a are arranged in order in a direction from the light valve 210 to the reflecting lens group 130, wherein the first lens L1 has two surfaces S1, S2, the second lens L2 has two surfaces S3, S4, the third lens L3 has two surfaces S5, S6, the fourth lens L4 has two surfaces S7, S8, the fifth lens L5 has two surfaces S9, S10, the sixth lens L6 has two surfaces S11, S12, the seventh lens L7 has two surfaces S13, S14, the eighth lens L8 has two surfaces S15, S16, the ninth lens L9 has two surfaces S17, S18, the tenth lens L10 has two surfaces S19, S20, and the eleventh lens L11 has two surfaces S21, S22, twelfth lens L12 has two surfaces S23, S24. The aforesaid two surfaces of each lens have an interval therebetween, and specify the interval is a straight-line distance between the two surfaces of each lens, and the straight-line distance is located on the optical axis 50.

Further, in the embodiment, the straight-line distance from the surface S2 of first lens L1 to the surface S3 of second lens L2 is 0.58 mm upon the optical axis 50. The straight-line distance from the surface S4 of second lens L2 to the surface S5 of third lens L3 is 0.77 mm upon the optical axis 50. The straight-line distance from the surface S6 of third lens L3 to the surface S7 of fourth lens L4 is 0.1 mm upon the optical axis 50. The straight-line distance from the surface S10 of fifth lens L5 to the surface S11 of sixth lens L6 is 24.82 mm upon the optical axis 50. The straight-line distance from the surface S12 of sixth lens L6 to the surface S13 of seventh lens L7 is 0.1 mm upon the optical axis 50. The straight-line distance from the surface S14 of seventh lens L7 to the surface S23 of twelfth lens L12 is 0.36 mm upon the optical axis 50. The straight-line distance from the surface S24 of twelfth lens L12 to the surface S15 of eighth lens L8 is 16.24 mm upon the optical axis 50. The straight-line distance from the surface S16 of eighth lens L8 to the surface S17 of ninth lens L9 is 0.1 mm upon the optical axis 50. The straight-line distance from the surface S18 of ninth lens L9 to the surface S19 of tenth lens L10 is 14.06 mm upon the optical axis 50. The straight-line distance from the surface S20 of tenth lens L10 to the surface S21 of eleventh lens L11 is 4.04 mm upon the optical axis 50. The straight-line distance from the surface S22 of eleventh lens L11 to the reflecting surface 130a of reflecting lens group 130 is 31.05 mm upon the optical axis 50. The above data are only exemplified to describe the embodiment, but the invention is not limited to that.

In the embodiment, the first lens L1, the eighth lens L8, the ninth lens L9, the tenth lens L10 and the twelfth lens L12 are aspheric lenses, that is to say, the surfaces S1, S2, S15, S16, S17, S18, S19, S20, S23 and S24 are aspheric surfaces. Moreover, the reflecting surface 130a also belongs to aspheric surface. Thus, the shapes of the surfaces S1, S2, S15, S16, S17, S18, S19, S20, S23, S24 and the reflecting surface 130a conform to the aspheric surface formula as given in Equation (E2):

$$Z(h) = \frac{h^2/r}{1 + \sqrt{1 - (1+k)(h^2/r^2)}} + C_2 h^2 + C_4 h^4 + C_6 h^6 + C_8 h^8 + C_{10} h^{10} + C_{12} h^{12} + C_{14} h^{14} \ldots \quad (E2)$$

Wherein "Z(h)" represents a sag in a direction of the optical axis 50. "r" represents a radius of an osculating sphere, that is, the curvature radius of the position near the optical axis 50 (as shown in Table 3, the reciprocal of the curvature of the surfaces S1, S2, S15, S16, S17, S18, S19, S20, S23, S24 and the reflecting surface 130a). "k" represents a conic constant. "h" represents a height of the aspheric surface, that is, a height from a center of the aspheric lens to an edge of the aspheric lens. "$C_2$", "$C_4$", "$C_6$", "$C_8$", "$C_{10}$", "$C_{12}$" and "$C_{14}$", etc. respectively represent aspheric coefficients. Values of k, $C_2$, $C_4$, $C_6$, $C_8$, $C_{10}$, $C_{12}$, $C_{14}$ and are shown in Table 4.

TABLE 4

Aspheric coefficients of the embodiment of FIG. 2

| surface | k | $C_2$ | $C_4$ | $C_6$ | $C_8$ | $C_{10}$ | $C_{12}$ | $C_{14}$ |
|---|---|---|---|---|---|---|---|---|
| S1 | 1.52E+00 | 0 | 1.20E−04 | 2.16E−06 | −3.03E−08 | 3.60E−10 | 0.00E+00 | 0.00E+00 |
| S2 | 1.12E+01 | 0 | 2.42E−04 | 2.12E−06 | −2.98E−08 | 3.10E−10 | −1.01E−12 | 0.00E+00 |

TABLE 4-continued

Aspheric coefficients of the embodiment of FIG. 2

| surface | k | $C_2$ | $C_4$ | $C_6$ | $C_8$ | $C_{10}$ | $C_{12}$ | $C_{14}$ |
|---|---|---|---|---|---|---|---|---|
| S23 | −2.49E−01 | 0 | −2.61E−05 | −3.23E−08 | −6.74E−11 | 1.43E−13 | −9.92E−16 | 1.61E−18 |
| S24 | −5.46E+00 | 0 | −1.91E−05 | −5.17E−09 | −1.80E−10 | −8.22E−14 | 1.28E−15 | −1.20E−18 |
| S15 | −2.42E+00 | 0 | 3.54E−06 | −1.06E−07 | 1.41E−10 | 1.84E−13 | 1.81E−17 | −4.07E−19 |
| S16 | −2.06E+00 | 0 | −4.22E−06 | −5.34E−08 | 7.02E−13 | 5.34E−13 | −9.02E−16 | 4.44E−19 |
| S17 | −1.64E+00 | 0 | 1.57E−04 | 2.28E−08 | −2.31E−09 | 5.61E−12 | 2.36E−14 | −1.47E−16 |
| S18 | −1.80E+00 | 0 | 2.34E−04 | −1.08E−06 | −1.64E−09 | 9.66E−12 | −1.58E−14 | 2.31E−17 |
| S19 | −7.85E−01 | 0 | −5.56E−05 | 1.79E−07 | 2.20E−08 | −6.76E−10 | 8.74E−12 | −5.03E−14 |
| S20 | 4.29E+00 | 0 | 1.79E−04 | −5.93E−06 | 2.19E−07 | −5.91E−09 | 7.87E−11 | −4.45E−13 |
| 130a | −4.43E+00 | 0 | 0.00E+00 | 0.00E+00 | 0.00E+00 | 0.00E+00 | 0.00E+00 | 0.00E+00 |

In the embodiment, an angle θ of a field of view of the second lens group 120 may be less than 100 degrees and greater than 20 degrees, and therefore, the lens diameter of the first lens group 110a and the second lens group 120 can be effectively reduced. In the embodiment, as a result of a diameter of the lens in the second lens group 120 (e.g., the eleventh lens L11) closest to the reflecting lens group 130 can be reduced, the image light beam 210a reflected by the reflecting lens group 130 is difficult to interfere with the eleventh lens L11, so as to prevent the quality of image frame from being affected. Specifically, the diameter of the eleventh lens L11 of the embodiment can be effectively reduced to about 20 mm, but the invention is not limited to that. In the projection lens 100a used the configuration of the invention, the diameter of the lens in the second lens group 120 (e.g., the eleventh lens L11) closest to the reflecting lens group 130 can be reduced in a range between 10 mm and 30 mm. Moreover, the throw ratio of the projection lens 100 is 0.25 in the embodiment, but the invention is not limited to that. The throw ratio of the projection lens 100a used the configuration of the invention can be maintained in a range between 0.1 and 0.4.

In summary, the projection lens used the configuration of the invention is a lens having the wide-angle function and lower throw rate. In the above embodiments of the invention, the projection lens has at least the following advantages. Since the reflecting lens group can provide the function of wide-angle lens group, the lens diameter of the first lens group and the second lens group can be effectively reduced, therefore the overall volume of the projection lens and the manufacture cost can be reduced. Further, as a result of the projected image frame and the light valve located at the same side of the optical axis, the offset of light valve relative to the optical axis can be reduced to avoid wasting the inner space of projection lens, therefore the overall volume of the projection lens and the manufacture cost can be reduced.

While the invention has been described in terms of preferred embodiments, those skilled in the art will recognize that the invention can be practiced with modifications within the scope of the appended claims.

What is claimed is:

1. A projection lens for a projection device having a light valve, the light valve being adapted to provide an image light beam, the projection lens comprising:
    a first lens group having positive refractive power;
    a second lens group having positive refractive power and disposed at a side of the first lens group far away from the light valve, the second lens group comprising a plurality of lenses, wherein the image light beam crosses an optical axis of the first lens group and then crosses an optical axis of the second lens group when the image light beam passes through the projection lens, and an angle of a field of view of the second lens group is less than 100 degrees; and
    a reflecting lens having negative reflective power and located at a side of the second lens group far away from the first lens group, the reflecting lens having a curved reflecting surface to reflect the image light beam passed through the second lens group.

2. The projection lens of claim 1, wherein a throw ratio of the projection lens is in a range between 0.1 and 0.4.

3. The projection lens of claim 1, wherein the angle of the field of view is greater than 20 degrees.

4. The projection lens of claim 1, wherein the first lens group comprises a first lens, a second lens, a third lens, a fourth lens, a fifth lens, a sixth lens, a seventh lens and a eighth lens arranged in order in a direction from the light valve to the second lens group, and the lenses of second lens group comprises a ninth lens, a tenth lens and an eleventh lens arranged in order in a direction from the first lens group to the reflecting lens.

5. The projection lens of claim 4, wherein the first lens and the fifth lens respectively have negative refractive power, the second lens, the third lens, the fourth lens, the sixth lens, the seventh lens, the eighth lens, the ninth lens, the tenth lens and the eleventh lens respectively have positive refractive power.

6. The projection lens of claim 4, wherein the first lens, the seventh lens, the eighth lens, the ninth lens and the tenth lens are aspheric lenses.

7. The projection lens of claim 4, wherein a compound lens is formed with the fourth lens and the fifth lens, and the compound lens has negative refractive power.

8. The projection lens of claim 4, wherein the first lens group further comprises a twelfth lens disposed between the seventh lens and the eighth lens.

9. The projection lens of claim 4, wherein a diameter of the eleventh lens is in a range between 10 mm and 30 mm.

10. A projection lens for a projection device having a light valve, the light valve being adapted to provide an image light beam, the projection lens comprising:
    a first lens group having positive refractive power, wherein the first lens group comprises a first aperture stop disposed therebetween;
    a second lens group having positive refractive power and disposed at a side of the first lens group far away from the light valve, the second lens group comprising a plurality of lenses, wherein the image light beam is diverged before the image light beam leaves the lens of the second lens group most far away from the first lens group, and an angle of a field of view of the second lens group is less than 100 degrees; and
    a reflecting lens having negative reflective power and located at a side of the second lens group far away from the first lens group, the reflecting lens having a curved reflecting surface to reflect the image light beam passed through the second lens group.

11. The projection lens of claim 10, further comprising an optical axis, wherein the light valve is adapted to provide the image light beam from a first side of the optical axis, and the curved reflecting surface reflects the image light beam which passed through the second lens group and then transmitted to the first side of the optical axis.

12. The projection lens of claim 10, wherein a throw ratio of the projection lens is in a range between 0.1 and 0.4.

13. The projection lens of claim 10, wherein the angle of the field of view is greater than 20 degrees.

14. The projection lens of claim 10, wherein the first lens group comprises a first lens, a second lens, a third lens, a fourth lens, a fifth lens, a sixth lens, a seventh lens and a eighth lens arranged in order in a direction from the light valve to the second lens group, and the lenses of second lens group comprises a ninth lens, a tenth lens and an eleventh lens arranged in order in a direction from the first lens group to the reflecting lens.

15. The projection lens of claim 14, wherein first aperture stop is located in the second lens or the third lens.

16. The projection lens of claim 14, wherein the second lens group further comprises a second aperture stop located between the tenth lens and the eleventh lens.

17. A projection lens, comprising:
a first lens group having a first aperture stop disposed therebetween;
a second lens group disposed at one side of the first lens group, wherein an image light beam is diverged when the image light beam passes through the second lens group; and
a reflecting lens located at a side of the second lens group far away from the first lens group, the reflecting lens is configured to reflect the image light beam passed through the second lens group,
wherein a throw ratio of the projection lens is in a range between 0.1 and 0.4.

18. The projection lens of claim 17, wherein the first lens group comprises a first lens, a second lens, a third lens, a fourth lens, a fifth lens, a sixth lens, a seventh lens and a eighth lens arranged in order in a direction from a light valve to the second lens group, and the second lens group comprises a ninth lens, a tenth lens and an eleventh lens arranged in order in a direction from the first lens group to the reflecting lens.

19. The projection lens of claim 18, wherein the first lens group further comprises a first aperture stop located in the second lens or the third lens.

\* \* \* \* \*